United States Patent [19]

Zun

[11] Patent Number: 4,880,331

[45] Date of Patent: Nov. 14, 1989

[54] RELEASABLE SWIVEL LOCK ASSEMBLY FOR A CANOPY SUPPORT OF A STROLLER

[76] Inventor: Hong-Fu Zun, No. 59, Alley 85, Lane 673, Chung Chen Road, Yi-Chia Village, Jen Te Hsiang, Tainan Hsien, Taiwan

[21] Appl. No.: 185,908

[22] Filed: Apr. 25, 1988

[51] Int. Cl.⁴ ............................................. F16B 1/00
[52] U.S. Cl. ...................................... 403/24; 403/97; 403/91
[58] Field of Search ............................ 403/97, 91, 24

[56] References Cited

U.S. PATENT DOCUMENTS

| 553,731 | 1/1896 | Fredrickson | 403/97 |
|---|---|---|---|
| 4,019,708 | 4/1977 | Croup | 403/97 |
| 4,447,170 | 5/1984 | Holmes | 403/97 X |
| 4,736,417 | 4/1988 | Van Dyke | 403/97 |

Primary Examiner—Andrew V. Kundrat
Attorney, Agent, or Firm—Ladas & Parry

[57] ABSTRACT

A swivel lock assembly includes pivotally interconnected first and second rods. A pivot of resilient material has two radially projecting end extrusions, one of which is passed through the bores of the rods and rotated to engage with a shallow groove of the corresponding rod surface. The other of the extrusions presses the rods against each other with its inwardly extending push arms so that the circularly arranged teeth of the rods mesh with each other, thereby preventing relative rotation of the rods. The rods can be forced by hand to disengage from each other, permitting the relative rotation of the rods. When the operator lets go of the rods, the push arms of the pivot press the rods toward each other to interlock the rods.

8 Claims, 4 Drawing Sheets

RELEASABLE SWIVEL LOCK ASSEMBLY FOR A CANOPY SUPPORT OF A STROLLER

BACKGROUND OF THE INVENTION

This invention relates to a releasable swivel lock assembly including two pivotally interconnected rods, especially for a canopy support of a stroller.

A common swivel lock assembly for a canopy support of a stroller is shown in FIG. 1. As illustrated, this conventional lock assembly includes a fixed frame A, a canopy support B, a compression spring C, a cover D, and a rivet E. The fixed frame A has a teethed portion A1 through which a central bore is formed. The support B has a circular socket B1 which includes a central bore and a teethed surface, and a tubular supporting portion B2 for the insertion of a canopy support rod (not shown) therein. The spring C is received within the socket B1. The cover D closes the opening of the socket B1 and has a circular hole opposite the bore of the socket B1. The rivet E is in turn passed through the cover D, spring C, socket B1, and frame A. The support B is pushed toward the frame A by the spring C so that the teeth of the support B mesh with the teeth of the frame A, thereby preventing the rotation of the support B relative to the frame A. When the socket B1 is forced to separate the teeth thereof from the teeth of the frame A, the support B can be rotated relative to the frame A so as to adjust the orientation of the supported canopy.

Because the support B is riveted to the frame A, the assembly process is time-consuming and the manufacturing cost is high. Furthermore, when the spring C suffers from resilience fatigue, it is difficult to replace it.

SUMMARY OF THE INVENTION

It is therefore the object of this invention to provide an inexpensive swivel lock assembly for a canopy support of a stroller which can be easily assembled.

According to this invention, a releasable swivel lock mechanism includes a first rod and a second rod. The first rod has a first engagement portion which includes a series of first circularly arranged teeth formed thereon, and a first central bore formed through the first engagement portion. The second rod has a second engagement portion which includes a series of second circularly arranged teeth formed thereon in alignement with the first teeth, and a second central bore formed through the second engagement portion in alignment with the first central bore. The assembly further includes a pivot passing through the first and second central bores for pivotally interconnecting the first and second engagement portions.

The pivot has an abutment extrusion radially projecting from one end thereof for abutting against the outer surface of the first engagement portion with the inward surface of the abutment extrusion, and a resilient press extrusion radially and inwardly extending from the other end of the pivot for pressing resiliently the second engagement portion against the first engagement portion to mesh the first teeth with the second teeth for preventing relative rotation between the first and second rods. The outward surface of the first engagement portion has a shallow groove engaged with the abutment extrusion of the pivot for preventing relative rotation between the first rod and the pivot. The first and second central bores are shaped in conformity with the abutment extrusion so that the abutment extrusion can pass through the first and second central bores to remove the pivot from the first and second engagement portions when the pivot is rotated to align the first and second central bores with the abutment extrusion.

Therefore, the first engagement portion can be forced by an operator to disengage the first teeth from the second teeth so that the first rod can rotate relative to the second rod. When the operator lets go of the first engagement portion, the press extrusion moves from a pressed position to its original position so as to press the second engagement portion against the first engagement portion.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
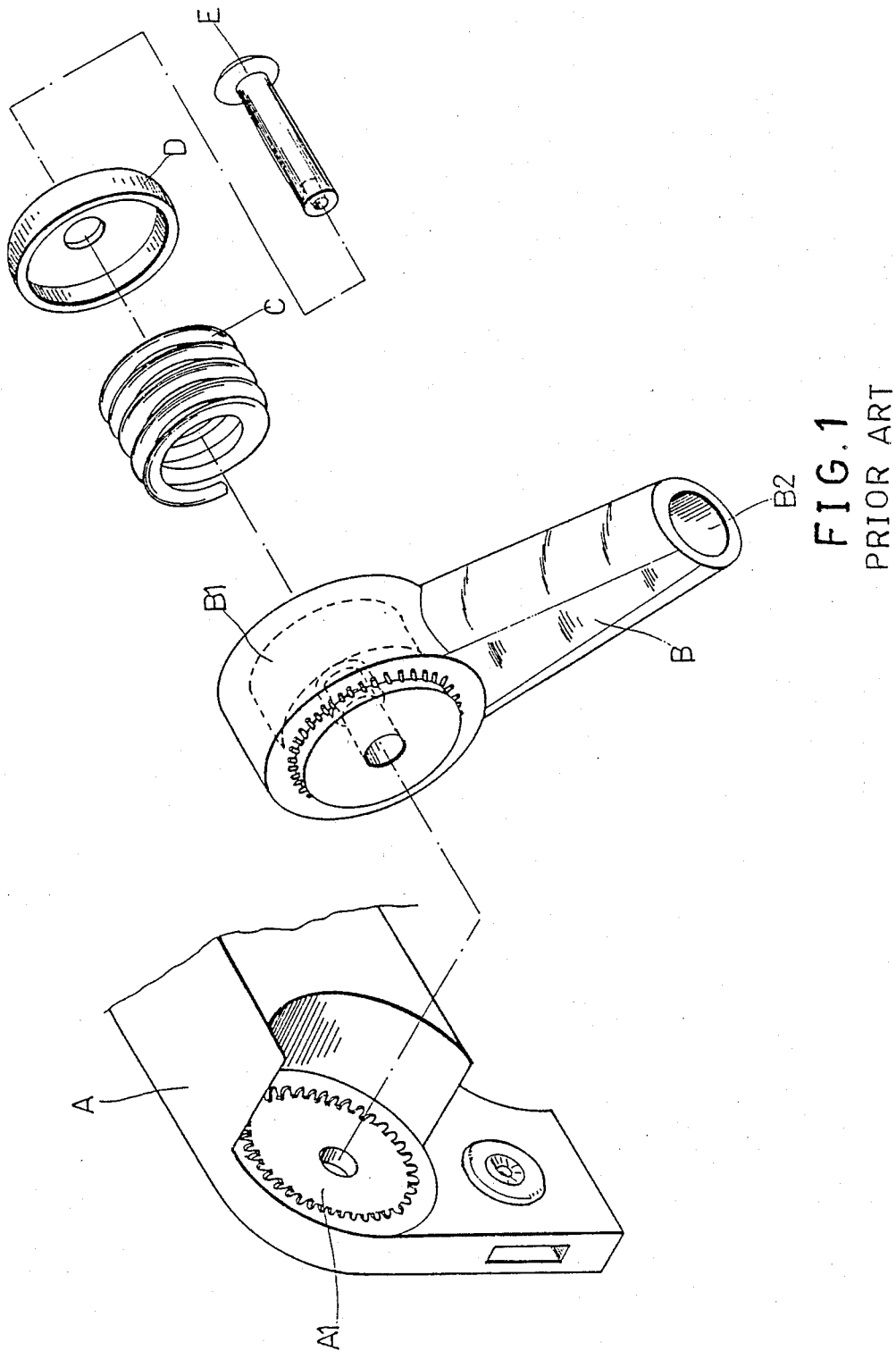
FIG. 1 is an exploded view of a conventional swivel lock assembly for a canopy support of a stroller.
Figure 2:
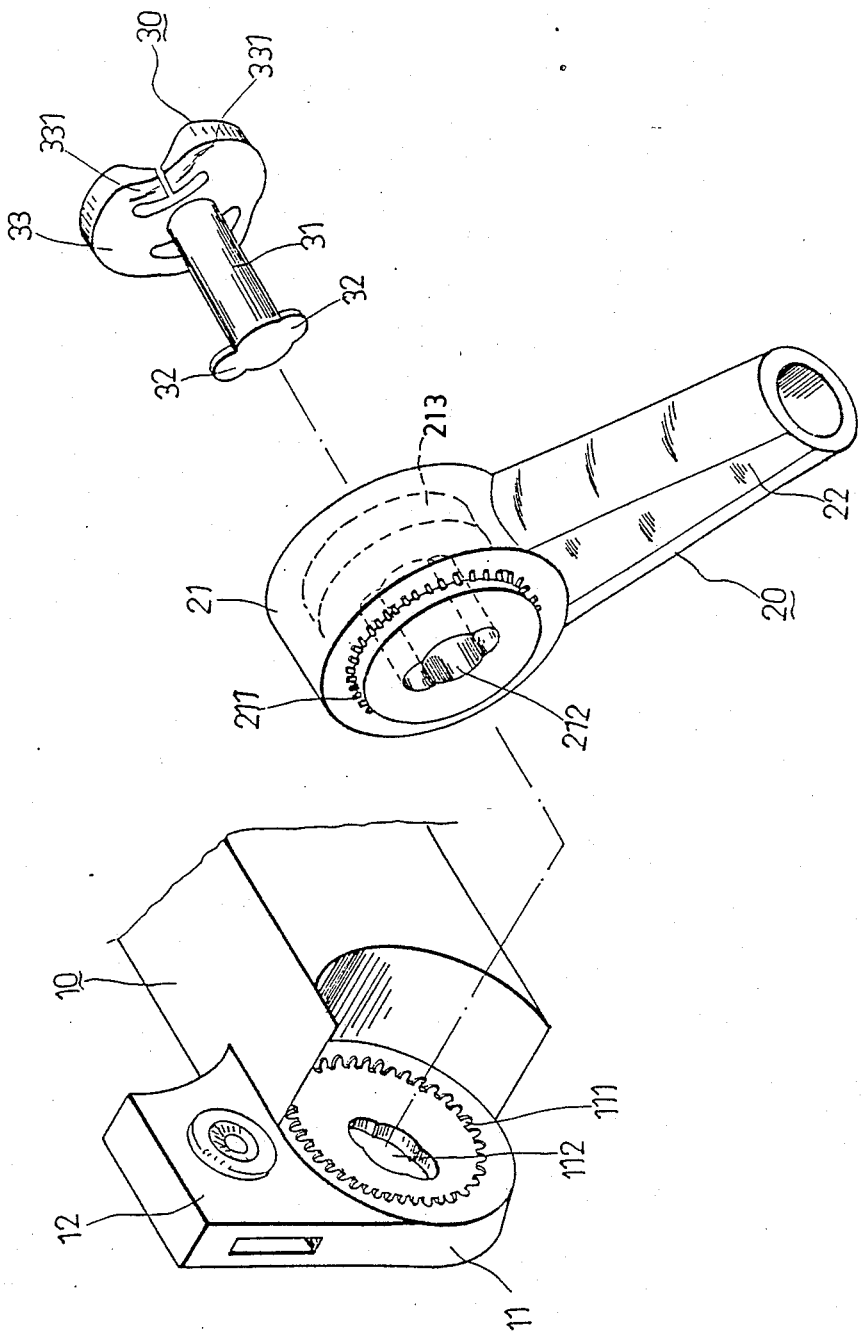
FIG. 2 is an exploded view showing a swivel lock assembly for a canopy support of a stroller in accordance with this invention.

Referring to FIGS. 2-5, a releasable swivel lock assembly of this invention includes a frame 10, a canopy support 20, and a nylon pivot 30. The frame 10 is fixed on a stroller and connected rotatably to the support 20 by the pivot 30.

The frame 10 has a depressed engagement portion 11 which includes a series of first circularly arranged teeth 111 formed thereon, a first generally oval central bore 112 formed through the engagement portion 11, and two shallow grooves 114 (see FIG. 3) formed in the outward surface of the engagement portion 11. The opening of the first bore 112 and the shallow grooves 114 together form a cross-shaped arrangement shown in FIG. 3. A retainer plate 12 projects from the engagement portion 11 in a known manner so that other optional elements may be riveted thereto.

The support 20 has a circular socket 21 including a series of second circularly arranged teeth 211 and a second generally oval central bore 212, and a tubular supporting portion 22 for the insertion of a canopy support rod (not shown). The second bore 212 is a counterbore which has a cylindrical enlarged end 213.

Figure 4:
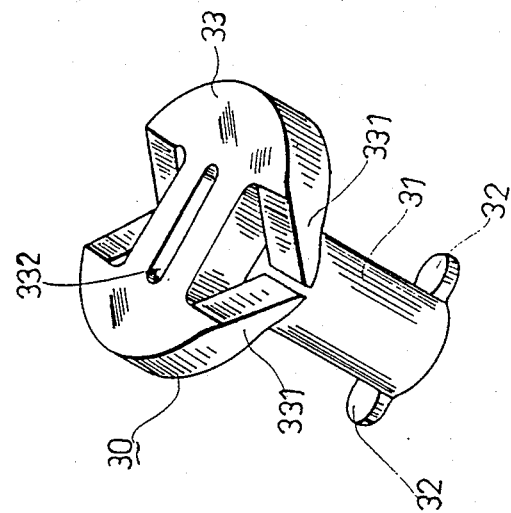
FIG. 4 is a perspective view showing the pivot of the swivel lock assembly according to this invention.
Figure 3:
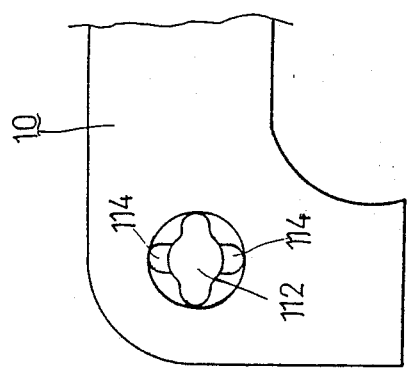
FIG. 3 is an elevational view showing the outward surface of the engagement portion of the fixed frame of the swivel lock assembly according to this invention.

Referring to FIG. 4, the pivot 30 has a cylindrical body 31, two opposed abutment extrusions 32 radially projecting from one end of the pivot 30, and two generally T-shaped press extrusions 33 radially and inwardly extending from the other end of the pivot 30. Each of the press extrusions 33 has two parallel push arms 331 and is received within the enlarged end 213 of the second bore 212. The ends of the two adjacent push arms 331 are spaced from each other at a predetermined distance so that they can be flexed outward.

Figure 5:
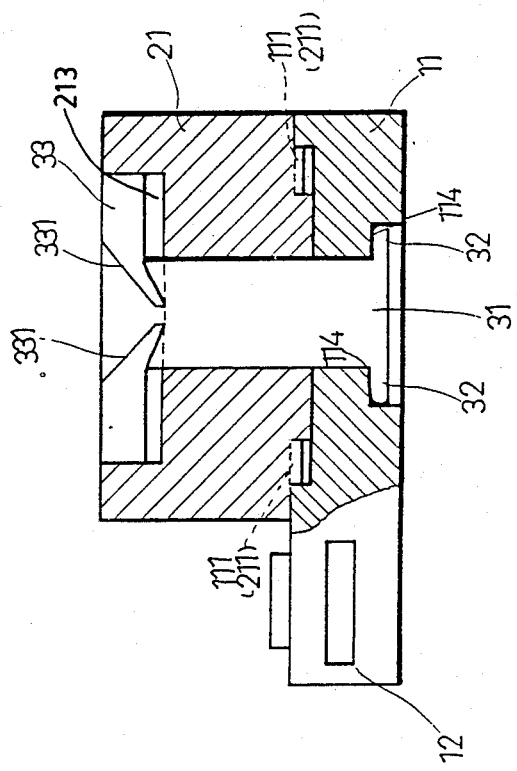
FIG. 5 is a schematic sectional view illustrating the swivel lock assembly according to this invention.

In assembly, the abutment extrusions 32 are first passed through the second bore 212 of the support 20 and the first bore 112 of the frame 10 and then rotated to engage with the shallow grooves 114, as shown in FIG. 5. The push arms 331 will press the socket 21 against the engagement portion 11 of the frame 10 so that the teeth 111 of the frame 10 will mesh with the teeth 211 of the support 20, thereby locking the support 20 on the frame 10. It is understood that it is easy to assemble the elements 10, 20 and 30 of this invention.

When the socket 21 is forced to disengage the teeth 211 of the support 20 from the teeth 111 of the frame 10 causing the push arms 331 to be flexed, the support 20 may be rotated relative to the frame 10 so as to adjust the orientation of a canopy. Upon completion of this adjustment, the operator may let go of the socket 21 so that the socket 21 is pushed toward the frame 10 by the push arms 331, thereby meshing the teeth 211 of the support 20 with the teeth 111 of the frame 10.

The press extrusion unit of the pivot 30 has a slot 332 (see FIG. 4) formed in its outward surface. The pivot 30 can be easily rotated relative to the frame 10 by inserting the wedged tip of a screwdriver into the slot 332.

Because of its simple structure and easy assembly, the manufacturing cost of the swivel lock assembly is lower than that of the prior art. Furthermore, the pressure to the frame 10 and the support 20 is applied through the nylon pivot 30. Because the pivot 30 is made of nylon, the swivel lock assembly of this invention is more durable than the prior art.

With this invention thus explained, it is apparent that numerous modifications and variations can be made without departing from the scope and spirit of this invention. It is therefore intended that this invention be limited only as indicated in the appended claims.

I claim:

1. A releasable swivel lock assembly for first and second rods, said first rod having a first engagement portion which includes a series of first circularly arranged teeth formed on a surface thereof, and a first central bore formed through said first engagement portion, said second rod having a second engagement portion which includes a series of second circularly arranged teeth formed on a surface thereof in alignement with said first teeth, and a second central bore formed through said second engagement portion in alignment with said first central bore, said assembly further including a pivot passing through said first and second central bores for pivotally interconnecting said first and second engagement portions;

characterized by said pivot having an abutment extrusion radially outwardly projecting from one end thereof for abutting against an outer surface of said first engagement portion with an inward surface of said abutment extrusion, and a resilient press extrusion extending from the other end of said pivot for pressing resiliently said second engagement portion against said first engagement portion to mesh said first teeth with said second teeth for preventing relative rotation between said first and second rods, said outward surface of said first engagement portion having a shallow engaged with said abutment extrusion of said pivot for preventing relative rotation between said first rod and said pivot, said first and second central bores being shaped in conformity with said abutment extrusion so that said abutment extrusion can pass through said first and second central bores to remove said pivot from said first and second engagement portions when said pivot is rotated to align said first and second central bores with said abutment extrusion, whereby, said first engagement portion can be forced by an operator to disengage said first teeth from said second teeth so that said first rod can rotate relative to said second rod; when the operator lets go of said first engagement portion, said press extrusion moves from a pressed position to its original position so as to press said second engagement portion against said first engagement portion.

2. A swivel lock assembly for a canopy support of a stroller, said assembly comprising:

a frame portion having a first bore therethrough, a first engagement means, and an outer surface;

a canopy support portion having a second bore therethrough, a tubular supporting portion and a second engagement means; and a pivot, said pivot having an abutment extrusion radially projecting from one end of said pivot for abutting against said outer surface, and a resilient press extrusion extending from the other end of said pivot so that when said pivot is inserted through said second bore and said first bore, said press extrusion resiliently presses said second engagement means against said first engagement means thereby preventing relative movement between said canopy portion and said frame portion.

3. A swivel lock assembly for a canopy support of a stroller, said assembly comprising:

a frame portion disposed on the stroller, said frame portion having a depressed engagement portion, a first generally oval bore through said depressed engagement portion, said engagement portion having an outward surface, said frame portion having two shallow grooves formed on said outward surface adjacent to said first bore, and first engagement means formed on said depressed engagement portion;

a canopy support portion having a circular socket and a tubular supporting portion attached to said circular socket, said circular socket having a second generally oval bore therethrough, said canopy portion further having a second engagement means disposed thereon; and a pivot, said pivot having a cylindrical body, an abutment extrusion radially projecting from one end of said cylindrical body for abutting against said shallow grooves of said first engagement portion, and a resilient press extrusions extending from the other end of said cylindrical body so that when said pivot is inserted through said second bore and said first bore, said press extrusion resiliently presses said second engagement means against said first engagement means thereby preventing relative movement between said canopy portion and said frame portion.

4. An assembly as claimed in claim 3 wherein said pivot has a slot disposed on said press extrusion so that said pivot can be easily rotated relative to the frame portion by inserting a wedged tip of a screwdriver into said slot and turning the screwdriver 5. An assembly as claimed in claim 3 wherein said first engagement means comprises a first plurality of circularly arranged teeth, said second engagement means comprises a second plurality of circularly arranged teeth, said teeth and said second teeth meshing to prevent the relative movement between said canopy portion and said frame portion.

6. As assembly as claimed in claim 3 wherein said pivot is made from nylon.

7. An assembly as claimed in claim 3 wherein said press extrusion has push arms resiliently urging said canopy support against said frame portion and also urging said first engaging means against second engaging means, so that when a force is exerted on said canopy support pushing it away from said frame, said resilient push arms are flexed permitting said first engaging means and said second engaging means to be disengaged and thereby permitting relative movement between said canopy support and said frame.

8. An assembly as claimed in claim 3 wherein said second bore has a cylindrical enlarged end, said enlarged end having a diameter greater than the diameter of said second bore, so that when said pivot is inserted through said first bore and said second bore, said press extrusion is disposed within said enlarged end.

* * * * *